US012718798B2

(12) United States Patent
Jho et al.

(10) Patent No.: US 12,718,798 B2
(45) Date of Patent: Aug. 25, 2026

(54) ELECTRONIC DEVICE AND METHOD FOR CREATING CUSTOMIZED LANGUAGE MODEL

(71) Applicant: SAMSUNG ELECTRONICS CO., LTD., Suwon-si (KR)

(72) Inventors: Gunu Jho, Suwon-si (KR); Hoseon Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 345 days.

(21) Appl. No.: 18/107,652

(22) Filed: Feb. 9, 2023

(65) Prior Publication Data

US 2023/0245647 A1 Aug. 3, 2023

Related U.S. Application Data

(63) Continuation of application No. PCT/KR2022/019865, filed on Dec. 8, 2022.

(30) Foreign Application Priority Data

Feb. 3, 2022 (KR) ........................ 10-2022-0014049
Mar. 7, 2022 (KR) ........................ 10-2022-0028880

(51) Int. Cl.
*G10L 13/00* (2006.01)
*G10L 15/06* (2013.01)
(Continued)

(52) U.S. Cl.
CPC .......... *G10L 15/063* (2013.01); *G10L 15/187* (2013.01); *G10L 15/22* (2013.01);
(Continued)

(58) Field of Classification Search
None
See application file for complete search history.

(56) References Cited

U.S. PATENT DOCUMENTS 9,471,566 B1 * 10/2016 Zhang .................. G06F 3/0237
9,966,060 B2 5/2018 Naik et al.
(Continued)

FOREIGN PATENT DOCUMENTS

JP 2007-178927 7/2007
JP 2007-199410 8/2007
(Continued)

OTHER PUBLICATIONS

Search Report dated Mar. 15, 2023 in counterpart International Patent Application No. PCT/KR2022/019865.

*Primary Examiner* — Jakieda R Jackson
(74) *Attorney, Agent, or Firm* — Nixon & Vanderhye, P.C.

(57) ABSTRACT

An example electronic device may include a memory configured to store instructions and a processor electrically connected to the memory and configured to execute the instructions. When the instructions are executed by the processor, the processor may be configured to create an automatic speech recognition (ASR) language model including information about a plurality of candidate transliterations for a variously utterable text, based on a context of a user indicating a situation of the user, a basic language model, or a customized language model and update the customized language model in response to an utterance of the user matching one of the plurality of candidate transliterations.

14 Claims, 12 Drawing Sheets

(51) Int. Cl.
*G10L 15/187* (2013.01)
*G10L 15/22* (2006.01)
*G10L 15/30* (2013.01)

(52) U.S. Cl.
CPC .......................... *G10L 2015/0635* (2013.01); *G10L 2015/223* (2013.01); *G10L 15/30* (2013.01)

(56) References Cited

U.S. PATENT DOCUMENTS 10,229,674 B2 * 3/2019 Menezes ............... G10L 15/187
10,332,510 B2 6/2019 Lee et al.
11,204,787 B2 * 12/2021 Radebaugh ........... G06F 16/245
2005/0216253 A1 * 9/2005 Brockett ................. G06F 40/44 704/5
2011/0010178 A1 1/2011 Lee et al.
2011/0137635 A1 * 6/2011 Chalabi ................... G06F 40/53 704/E17.001
2012/0022867 A1 * 1/2012 Ballinger ............ G06F 3/04886 704/235
2015/0127321 A1 * 5/2015 Waibel .................... G06F 40/58 704/2
2015/0309984 A1 * 10/2015 Bradford ............... G06F 40/263 704/8
2016/0336008 A1 * 11/2016 Menezes ............... G06F 40/295
2016/0358596 A1 * 12/2016 Singh ...................... G10L 13/08
2017/0177569 A1 * 6/2017 Raemy .................. G06F 40/205
2020/0082808 A1 3/2020 Li et al.
2020/0160836 A1 5/2020 Chen et al.
2020/0193971 A1 * 6/2020 Feinauer ............... G10L 15/075
2020/0193977 A1 6/2020 Ramabhadran et al.
2021/0124803 A1 * 4/2021 Alloh .................... G06F 40/247
2023/0094511 A1 * 3/2023 Guha ...................... G10L 15/26 704/231
2023/0116268 A1 * 4/2023 Prasad .................... G06F 40/45 704/2

FOREIGN PATENT DOCUMENTS

JP 2008-176202 7/2008
JP 2008-216756 9/2008
KR 10-1556173 9/2015
KR 10-2100389 5/2020

* cited by examiner

ELECTRONIC DEVICE AND METHOD FOR CREATING CUSTOMIZED LANGUAGE MODEL

CROSS-REFERENCE TO RELATED APPLICATIONS

This application is a continuation application of International Application No. PCT/KR2022/019865 designating the United States, filed on Dec. 8, 2022, in the Korean Intellectual Property Receiving Office and claiming priority to Korean Patent Application No. 10-2022-0014049, filed on Feb. 3, 2022, and Korean Patent Application No. 10-2022-0028880, filed on Mar. 7, 2022, in the Korean Intellectual Property Office, the disclosures of which are incorporated by reference herein in their entireties.

BACKGROUND

1. Field

The disclosure relates to an electronic device and method for creating a customized language model.

2. Description of Related Art

A language model (LM) of an automatic speech recognition (ASR) module may be needed to recognize to which text a recognized speech corresponds and convert the recognized speech, and a text-to-speech (TTS) module may be needed to determine how to read a given text.

Conventionally, the ASR language model may include a phoneme-to-grapheme model and/or an inverse text normalization model and the TTS language model may include a grapheme-to-phoneme model and/or a text normalization model. The ASR language model and the TTS language model may perform a function based on rules, dictionaries, and machine learning, but database quality and an algorithm prediction rate may greatly affect a processing of foreign words or proper nouns.

SUMMARY

Korean often sees Latin-based foreign words or words including Chinese characters (e.g., celebrity names, place names, movie titles, and music titles), which may variously be read depending on the context and pronounced differently by each user. The automatic speech recognition (ARS) module of a related language model may not recognize a text (e.g., a text variously pronounceable) depending on how a user utters the text, and a text-to-speech (TTS) module may pronounce the text differently from the text that the user pronounces, thus resulting in an inappropriate response. For example, when there is a text variously utterable (e.g., 金銀) in the user's contact information, a transliteration result of the text (e.g., Eun Kim or Eun Geum) may greatly affect recognition of the user's command and a voice output quality. Korean increasingly sees not only names included in contact information of a personal user, but also movie titles, music titles, and artists' names including a combination of Latin-based words, symbols, and numbers. Accordingly, it may take significant effort and cost to collect all information about a text variously utterable to build an utterance database and to improve the performance of an ASR module, a TTS module, and a natural language understanding (NLU) module. There may be need for technology capable of performing voice recognition and voice utterance customized to a user, based on a customized language model.

An embodiment may provide technology for performing voice recognition and voice utterance customized to a user, based on an updated customized language model, in response to an utterance of the user matching one of a plurality of candidate transliterations for a variously utterable text.

The technical goals to be achieved are not limited to those described above, and other technical goals not mentioned above are clearly understood from the following description.

According to an embodiment, an electronic device may include a memory configured to include instructions and a processor electrically connected to the memory and configured to execute the instructions. When the instructions are executed by the processor, the processor may be configured to generate an automatic speech recognition (ASR) language model including information about a plurality of candidate transliterations for variously utterable text, based on a context of a user indicating a situation of the user, a basic language model, and/or a customized language model, and update the customized language model in response to an utterance of the user matching one of the plurality of candidate transliterations.

According to an embodiment, an electronic device may include a memory configured to include instructions and a processor electrically connected to the memory and configured to execute the instructions. When the instructions are executed by the processor, the processor may be configured to receive an utterance of a user in which a text including a first language is expressed in a second language, and recognize the utterance and provide a response, based on an ASR language model including information about a plurality of candidate transliterations transliterated into the second language for the text.

According to an embodiment, a method of operating an electronic device may include generating an ASR language model including information about a plurality of candidate transliterations for variously utterable text, based on a context of a user indicating a situation of the user, a basic language model, and/or a customized language model, and update the customized language model in response to an utterance of the user matching one of the plurality of candidate transliterations.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
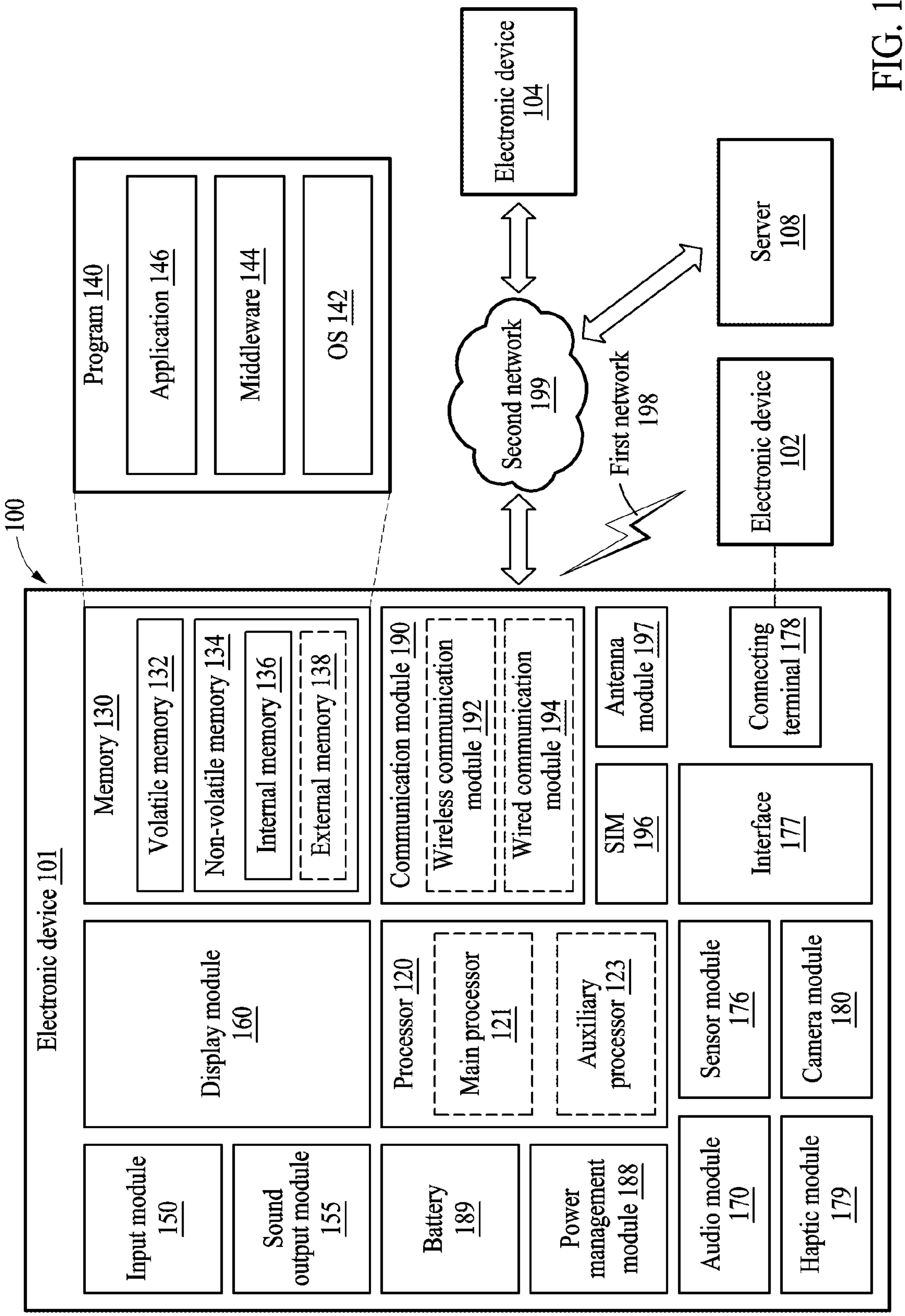
FIG. 1 is a block diagram illustrating an electronic device in a network environment according to an embodiment.

Hereinafter, embodiments will be described in detail with reference to the accompanying drawings. When describing the embodiments with reference to the accompanying drawings, like reference numerals refer to like elements and a description related thereto will not be repeated.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In one example embodiment, at least one of the components (e.g., the connecting terminal 178) may be omitted from the electronic device 101, or one or more other components may be added in the electronic device 101. In one example embodiment, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, where the electronic device 101 includes the main processor 121 and the auxiliary processor 123, the auxiliary processor 123 may be adapted to consume less power than the main processor 121 or to be predetermined to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to one example embodiment, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, “A or B”, “at least one of A and B”, “at least one of A or B”, “A, B or C”, “at least one of A, B and C”, and “at least one of A, B, or C,” each of which may include any one of the items listed together in the corresponding one of the phrases, or all possible combinations thereof. Terms such as “$1^{st}$”, “$2^{nd}$” or “first” or “second” may simply be used to distinguish the component from other components in question, and do not limit the components in other aspects (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., by wire), wirelessly, or via a third element.

As used in connection with various example embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term “non-transitory” simply refers, for example, to a storage medium that is a tangible device, and may not include a signal (e.g., an electromagnetic wave), but this term does not differentiate between data which is semi-permanently stored in the storage medium and data which is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
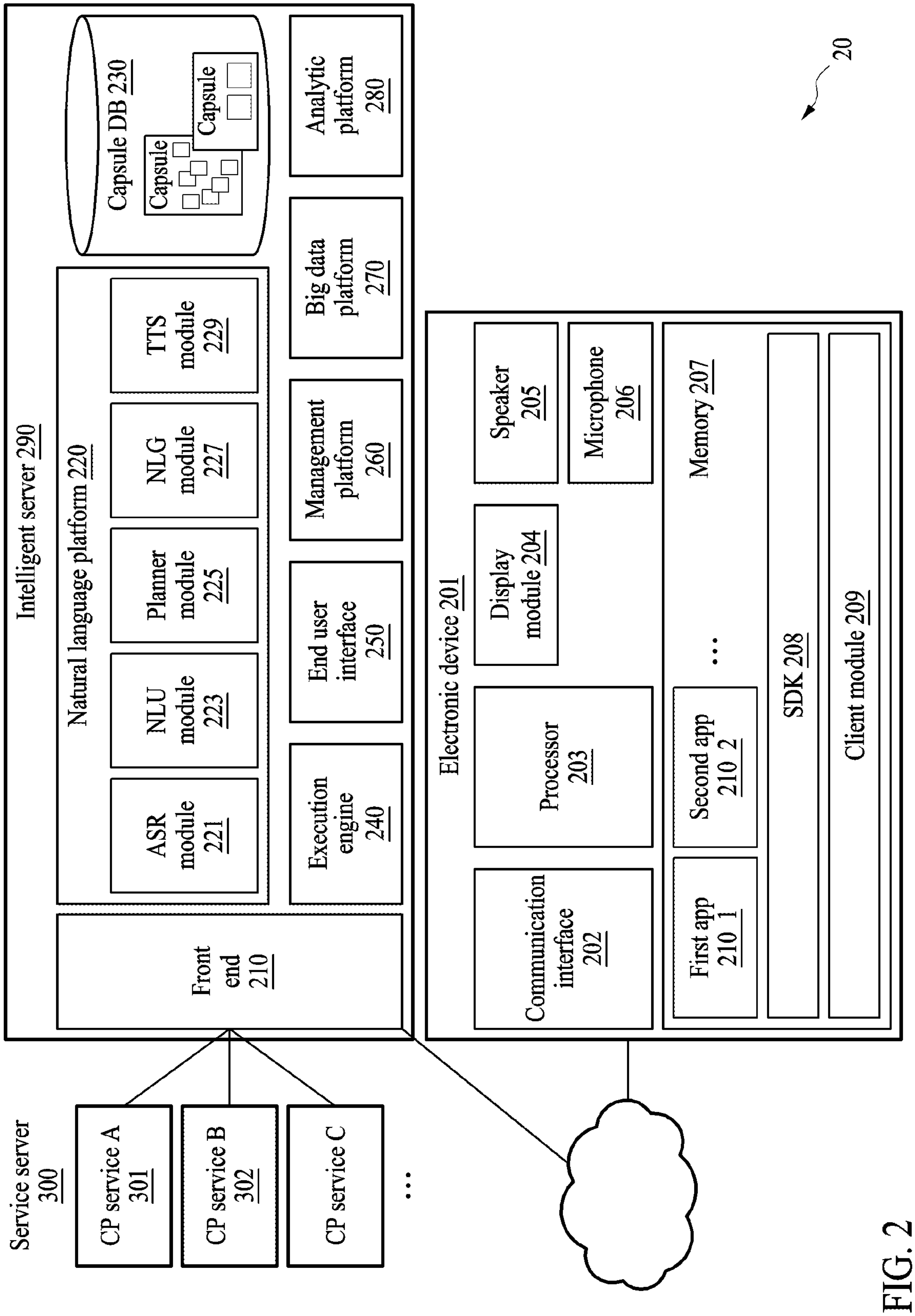
FIG. 2 is a block diagram illustrating an integrated intelligence system according to an embodiment.

Referring to FIG. 2, an integrated intelligence system 20 according to one example embodiment may include an electronic device 201 (e.g., the electronic device 101 of FIG. 1), an intelligent server 290 (e.g., the server 108 of FIG. 1), and a service server 300 (e.g., the server 108 of FIG. 1).

The electronic device 201 may be a terminal device (or an electronic device) connectable to the Internet and may be, for example, a mobile phone, a smartphone, a personal digital assistant (PDA), a notebook computer, a TV, a white home appliance, a wearable device, a head-mounted display (HMD), a smart speaker, or the like.

According to the shown example embodiment, the electronic device 201 may include a communication interface 202 (e.g., the interface 177 of FIG. 1), a microphone 206 (e.g., the input module 150 of FIG. 1), a speaker 205 (e.g., the sound output module 155 of FIG. 1), a display module 204 (e.g., the display module 160 of FIG. 1), a memory 207 (e.g., the memory 130 of FIG. 1), or a processor 203 (e.g., the processor 120 of FIG. 1). The components listed above may be operationally or electrically connected to each other.

The communication interface 202 may be connected to an external device and configured to transmit and receive data to and from the external device. The microphone 206 may receive sound (e.g., a user utterance) and convert the sound into an electrical signal. The speaker 205 may output the electrical signal as sound (e.g., speech).

The display module 204 may be configured to display an image or video. The display module 204 may also display a graphical user interface (GUI) of an app (or an application program) being executed. The display module 204 may receive a touch input through a touch sensor. For example, the display module 204 may receive a text input through a touch sensor in an on-screen keyboard area displayed on the display module 204.

The memory 207 may store a client module 209, a software development kit (SDK) 208, and a plurality of apps. The client module 209 and the SDK 208 may configure a framework (or a solution program) for performing general-purpose functions. In addition, the client module 209 or the SDK 208 may configure a framework for processing a user input (e.g., a voice input, a text input, or a touch input).

The plurality of apps stored in the memory 207 may be programs for performing designated functions. The plurality of apps may include a first app 210_1, a second app 210_2, and the like. Each of the plurality of apps may include a plurality of actions for performing a designated function. For example, the apps may include an alarm app, a messaging app, and/or a scheduling app. The plurality of apps may be executed by the processor 203 to sequentially execute at least some of the plurality of actions.

The processor 203 may control the overall operation of the electronic device 201. For example, the processor 203 may be electrically connected to the communication interface 202, the microphone 206, the speaker 205, and the display module 204 to perform a designated operation.

The processor 203 may also perform the designated function by executing the program stored in the memory 207. For example, the processor 203 may execute at least one of the client module 209 and the SDK 208 to perform the following operation for processing a user input. The processor 203 may control the operation of the plurality of apps 210 through, for example, the SDK 208. The following operation, which is the operation of the client module 209 or the SDK 208, may be performed by the processor 203.

The client module 209 may receive a user input. For example, the client module 209 may receive a voice signal corresponding to a user utterance sensed through the microphone 206. In another example, the client module 209 may receive a touch input sensed through the display module 204. In still another example, the client module 209 may receive a text input sensed through a keyboard or an on-screen keyboard. In addition, the client module 209 may receive various types of user inputs sensed through an input module included in the electronic device 201 or an input module connected to the electronic device 201. The client module 209 may transmit the received user input to the intelligent server 290. The client module 209 may transmit, to the intelligent server 290, state information of the electronic device 201 together with the received user input. The state information may be, for example, execution state information of an app.

The client module 209 may receive a result corresponding to the received user input. For example, where the intelligent server 290 is capable of calculating a result corresponding to the received user input, the client module 209 may receive the result corresponding to the received user input. The client module 209 may display the received result on the display module 204. Also, the client module 209 may output the received result as audio through the speaker 205.

The client module 209 may receive a plan corresponding to the received user input. The client module 209 may display results of executing a plurality of actions of an app according to the plan on the display module 204. For example, the client module 209 may sequentially display the results of executing the plurality of actions on the display module 204 and output the results as audio through the speaker 205. For example, the electronic device 201 may display only a portion of the results of executing the plurality of actions (e.g., a result of the last action) on the display module 204 and output the portion of the results as audio through the speaker 205.

According to an example embodiment, the client module 209 may receive, from the intelligent server 290, a request for obtaining information necessary for calculating a result corresponding to the user input. According to an example embodiment, the client module 209 may transmit the necessary information to the intelligent server 290 in response to the request.

The client module 209 may transmit, to the intelligent server 290, information on the results of executing the plurality of actions according to the plan. The intelligent server 290 may confirm that the received user input has been correctly processed using the information on the results.

The client module 209 may include a speech recognition module. According to an example embodiment, the client module 209 may recognize a voice input for performing a limited function through the speech recognition module. For example, the client module 209 may execute an intelligent app for processing a voice input to perform an organic operation through a designated input (e.g., Wake up!).

The intelligent server 290 may receive information related to a user voice input from the electronic device 201 through a communication network. According to an example embodiment, the intelligent server 290 may change data related to the received voice input into text data. According to an example embodiment, the intelligent server 290 may generate a plan for performing a task corresponding to the user voice input, based on the text data.

According to an example embodiment, the plan may be generated by an artificial intelligence (AI) system. The AI system may be a rule-based system, or a neural network-based system (e.g., a feedforward neural network (FNN) or a recurrent neural network (RNN)). Alternatively, the AI system may be a combination thereof or other AI systems. According to an example embodiment, the plan may be selected from a set of predefined plans or may be generated in real time in response to a user request. For example, the AI system may select at least one plan from among the predefined plans.

The intelligent server 290 may transmit a result according to the generated plan to the electronic device 201 or transmit the generated plan to the electronic device 201. According to an example embodiment, the electronic device 201 may display the result according to the plan on the display module 204. According to an example embodiment, the electronic device 201 may display, on the display module 204, a result of executing an action according to the plan.

The intelligent server 290 may include a front end 210, a natural language platform 220, a capsule database (DB) 230, an execution engine 240, an end user interface 250, a management platform 260, a big data platform 270, or an analytic platform 280.

The front end 210 may receive the received user input from the electronic device 201. The front end 210 may transmit a response corresponding to the user input.

According to an example embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert the voice input received from the electronic device 201 into text data. The NLU module 223 may discern an intent of a user using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase and determine the intent of the user by matching the discerned meaning of the word to an intent.

The planner module 225 may generate a plan using a parameter and the intent determined by the NLU module 223. According to an example embodiment, the planner module 225 may determine a plurality of domains required to perform a task, based on the determined intent. The planner module 225 may determine a plurality of actions included in each of the plurality of domains determined based on the intent. According to an example embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions, based on the parameter required for the execution of the plurality of actions and results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 that stores a set of relationships between concepts and actions.

The NLG module 227 may change designated information into a text form. The information changed to a text form may be in the form of a natural language utterance. The TTS module 229 may change information in a text form into information in a speech form.

According to an example embodiment, some or all of the functions of the natural language platform 220 may be implemented in the electronic device 201 as well.

The capsule DB 230 may store information on the relationship between concepts and actions corresponding to the plurality of domains. A capsule according to an example embodiment may include a plurality of action objects (or action information) and concept objects (or concept information) included in the plan. According to an example embodiment, the capsule DB 230 may store a plurality of capsules as a concept action network (CAN). According to an example embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan where there are plans corresponding to the user input.

According to an example embodiment, the capsule DB 230 may include a follow-up registry that stores information on follow-up actions for suggesting a follow-up action to the user in a designated situation. The follow-up action may include, for example, a follow-up utterance. According to an example embodiment, the capsule DB 230 may include a layout registry that stores layout information of information output through the electronic device 201. According to an example embodiment, the capsule DB 230 may include a vocabulary registry that stores vocabulary information included in capsule information. According to an example embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In an example embodiment, the capsule DB 230 may be implemented in the electronic device 201 as well.

The execution engine 240 may calculate a result using the generated plan. The end user interface 250 may transmit the calculated result to the electronic device 201. Accordingly, the electronic device 201 may receive the result and provide the received result to the user. The management platform 260 may manage information used by the intelligent server 290. The big data platform 270 may collect data of the user. The analytic platform 280 may manage a quality of service (QoS) of the intelligent server 290. For example, the analytic platform 280 may manage the components and processing rate (or efficiency) of the intelligent server 290.

The service server 300 may provide a designated service (e.g., a food order or hotel reservation) to the electronic device 201. According to an example embodiment, the service server 300 may be a server operated by a third party. The service server 300 may provide, to the intelligent server 290, information to be used for generating a plan corresponding to the received user input. The provided information may be stored in the capsule DB 230. In addition, the service server 300 may provide, to the intelligent server 290, result information according to the plan.

In the integrated intelligence system 20 described above, the electronic device 201 may provide various intelligent services to the user in response to a user input. The user input may include, for example, an input performed by a physical button, a touch, or a voice.

In an example embodiment, the electronic device 201 may provide a speech recognition service through an intelligent app (or a speech recognition app) stored therein. In this example, the electronic device 201 may recognize a user utterance or a voice input received through the microphone and provide, to the user, a service corresponding to the recognized voice input.

In an example embodiment, the electronic device 201 may perform a designated action alone or together with the intelligent server 290 and/or the service server 300, based on the received voice input. For example, the electronic device 201 may execute an app corresponding to the received voice input and perform a designated action through the executed app.

In an example embodiment, where the electronic device 201 provides a service together with the intelligent server 290 and/or the service server 300, the electronic device 201 may detect a user utterance using the microphone 206 and generate a signal (or voice data) corresponding to the detected user utterance. The electronic device 201 may transmit the voice data to the intelligent server 290 using the communication interface 202.

The intelligent server 290 may generate, as a response to the voice input received from the electronic device 201, a plan for performing a task corresponding to the voice input or a result of performing an action according to the plan. The plan may include, for example, a plurality of actions for performing a task corresponding to a voice input of a user and a plurality of concepts related to the plurality of actions. The concepts may define parameters input to the execution of the plurality of actions or result values output by the execution of the plurality of actions. The plan may include connection information between the plurality of actions and the plurality of concepts.

The electronic device 201 may receive the response using the communication interface 202. The electronic device 201 may output a voice signal internally generated by the electronic device 201 to the outside using the speaker 205, or output an image internally generated by the electronic device 201 to the outside using the display module 204.

Figure 3:
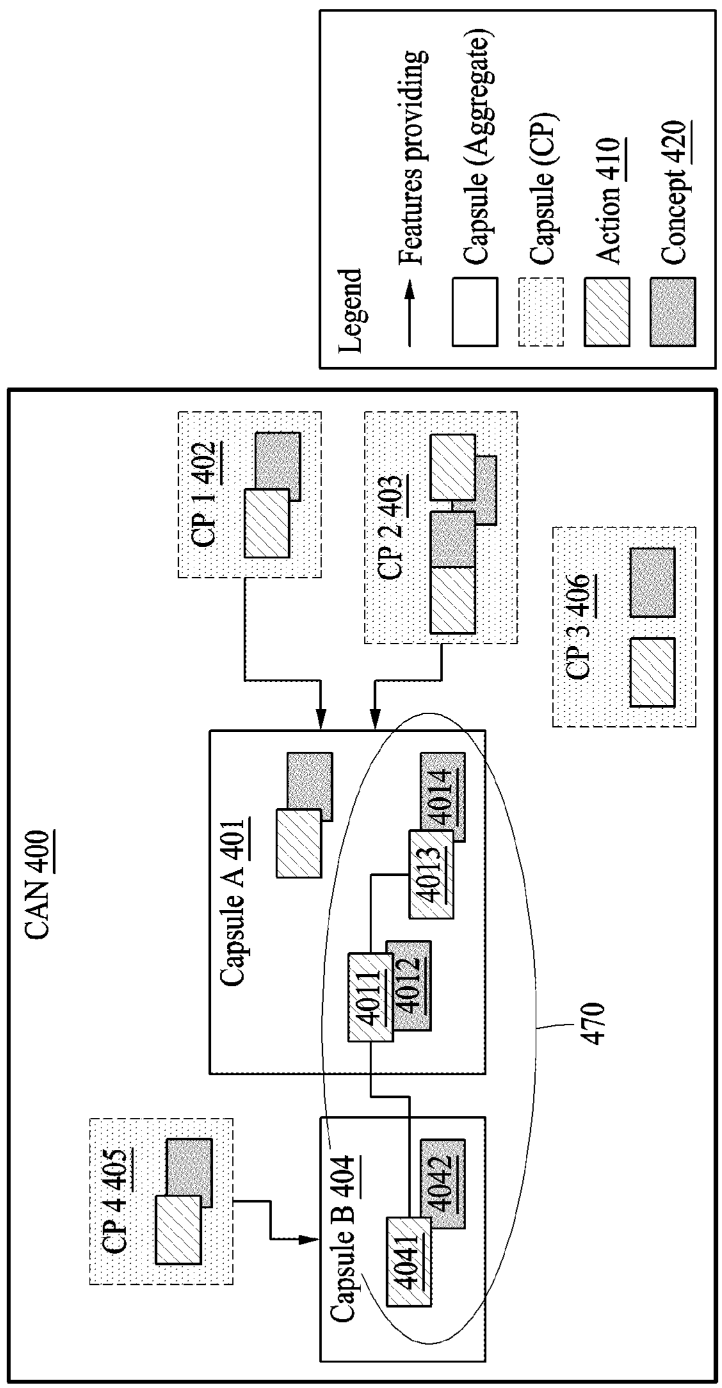
FIG. 3 is a diagram illustrating a form in which relationship information between concepts and actions is stored in a database according to an embodiment.

FIG. 3 is a diagram illustrating a form in which relationship information between concepts and actions is stored in adatabase according to an embodiment.

A capsule DB (e.g., the capsule DB 230) of the intelligent server 290 may store capsules as a CAN 400. The capsule DB may store, as a CAN, an action for processing a task corresponding to a voice input of a user and a parameter necessary for the action.

The capsule DB may store a plurality of capsules (a capsule A 401 and a capsule B 404) respectively corresponding to a plurality of domains (e.g., applications). According to an example embodiment, one capsule (e.g., the capsule A 401) may correspond to one domain (e.g., a location (geo) or an application). Furthermore, the one capsule may correspond to at least one service provider (e.g., CP 1 402 or CP 2 403) for performing a function for a domain related to the capsule. According to an example embodiment, one capsule may include at least one action 410 for performing a designated function and at least one concept 420.

The natural language platform 220 may generate a plan for performing a task corresponding to the received voice input by using the capsules stored in the capsule DB. For example, the planner module 225 of the natural language platform 220 may generate the plan using the capsules stored in the capsule DB. For example, a plan 470 may be generated using actions 4011 and 4013 and concepts 4012 and 4014 of the capsule A 401 and an action 4041 and a concept 4042 of the capsule B 404.

Figure 4:
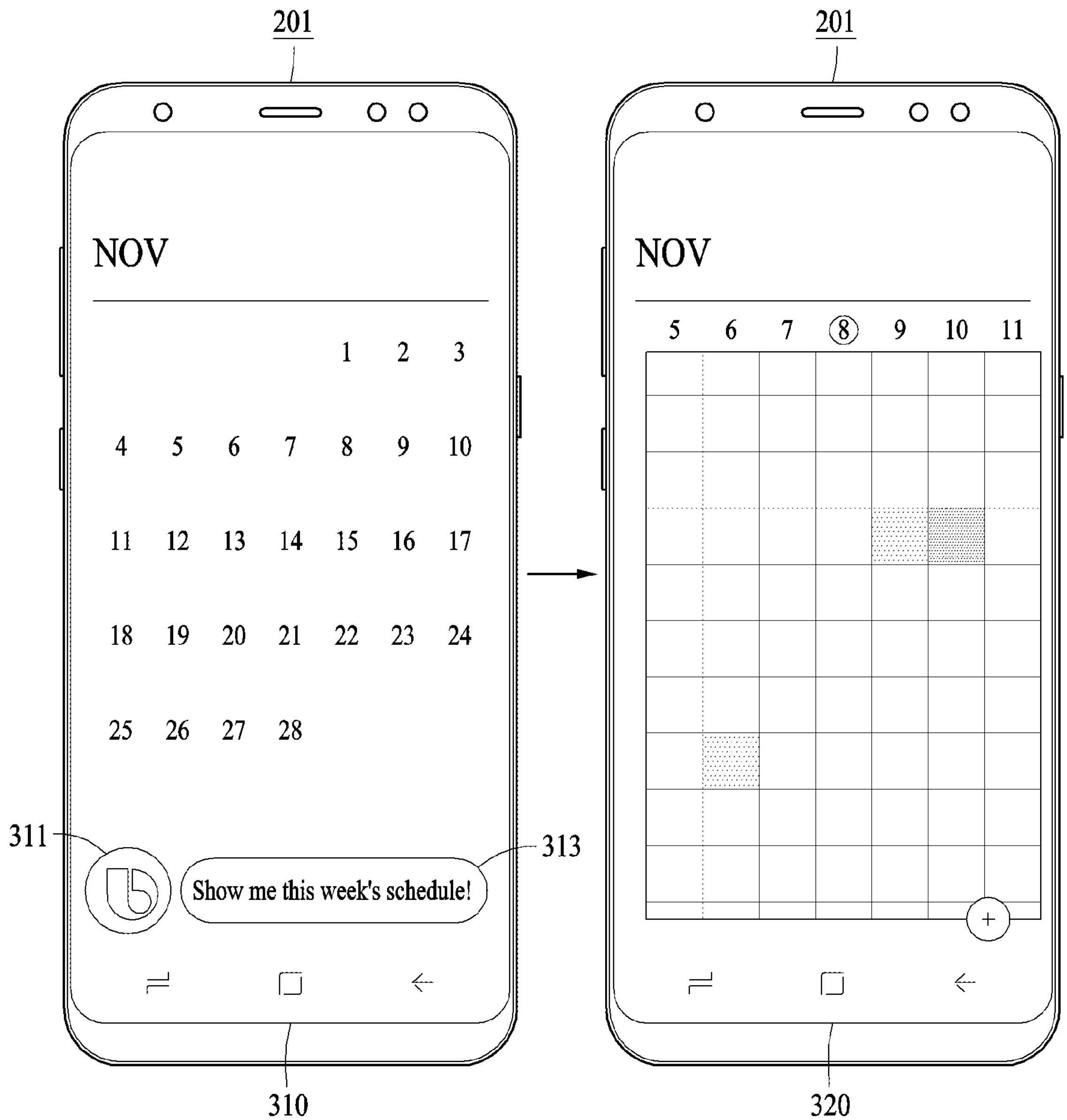
FIG. 4 is a diagram illustrating a screen of an electronic device processing a received voice input through an intelligent app according to an embodiment.

FIG. 4 is a diagram illustrating a screen of an electronic device processing a received voice input through an intelligent app according to an embodiment.

The electronic device 201 may execute an intelligent app to process a user input through the intelligent server 290.

According to an example embodiment, on a screen 310, when a designated voice input (e.g., Wake up!) is recognized or an input through a software key (e.g., a dedicated software key) is received, the electronic device 201 may execute an intelligent app for processing the voice input. The electronic device 201 may execute the intelligent app, for example, once a scheduling app is executed. According to an example embodiment, the electronic device 201 may display an object (e.g., an icon) 311 corresponding to the intelligent app on the display module 204. According to an example embodiment, the electronic device 201 may receive a voice input by a user utterance. For example, the electronic device 201 may receive a voice input of "Show me this week's schedule!". According to an example embodiment, the electronic device 201 may display a user interface (UI) 313 (e.g., an input window) of the intelligent app in which text data of the received voice input is displayed on the display module 204.

According to an example embodiment, on a screen 320, the electronic device 201 may display, on the display module 204, a result corresponding to the received voice input. For example, the electronic device 201 may receive a plan corresponding to the received user input and display "this week's schedule" on the display module 204 according to the plan.

Figure 5:
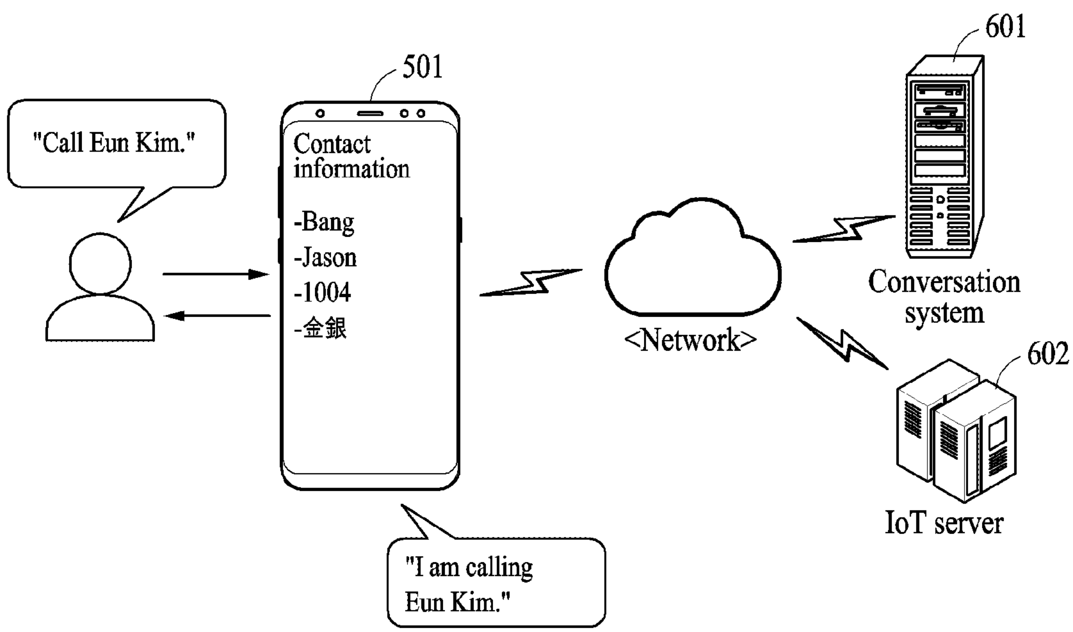
FIG. 5 is a diagram illustrating an operation in which an electronic device recognizes a user's utterance and provides a response, according to an embodiment.

FIG. 5 is a diagram illustrating a concept in which an electronic device provides a response in response to a user's utterance, according to an embodiment.

Referring to FIG. 5, according to an embodiment, an electronic device 501 (e.g., the electronic device 101 of FIG. 1 or the electronic device 201 of FIG. 2), a conversation system 601 (e.g., the intelligent server 290 of FIG. 2), and an IoT server 602 may be connected to each other through a LAN, a WAN, a value added network (VAN), a mobile radio communication network, a satellite communication network, or a combination thereof. The electronic device 501, the IoT server 602, and the conversation system 601 may communicate with each other via a wired communication method or a wireless communication method (e.g., wireless LAN (Wi-Fi), Bluetooth, Bluetooth low energy, ZigBee, Wi-Fi Direct (WFD), ultra-wide band (UWB), IrDA, and near field communication (NFC)).

According to an embodiment, the electronic device 501 may be implemented by at least one of a smartphone, a tablet personal computer (PC), a mobile phone, a speaker (e.g., an AI speaker), a video phone, and an e-book reader, a desktop PC, a laptop PC, a netbook computer, a workstation, a server, a PDA, a portable multimedia player (PMP), an MP3 player, a camera, a wearable device, or the like.

According to an embodiment, the electronic device 501 may obtain a voice signal from a user's utterance and transmit the voice signal to the conversation system 601. The voice signal may be a readable text into which the electronic device 501 converts the voice signal by performing ASR on the user's utterance. The conversation system 601 may analyze the user's utterance based on the voice signal and use a result of the analysis (e.g., intent, entity, and/or capsule) to provide, to a device (e.g., the electronic device 501), a response (e.g., an answer) to be provided to the user. The communication system 601 may, for example, be implemented as software. Part or all of the conversation system 601 may be implemented in the electronic device 501 and/or an intelligent server (e.g., the intelligent server 290 of FIG. 2).

According to an embodiment, the IoT server 602 may obtain, store, and manage device information (e.g., a device ID, a device type, information about a capability of performing a function, location information (e.g., information about a registration place), or state information with respect to a device (e.g., the electronic device 501)) that a user has. The electronic device 501 may be a device previously registered in the IoT server 602 in relation to the user's account information (e.g., a user ID).

According to an embodiment, the information about a capability of performing a function may be information about a device's function pre-defined for performing an operation. For example, when the device is an air conditioner, the information about a capability of performing a function of the air conditioner may indicate a function, such as temperature up, temperature down, or air purification. When the device is a speaker, the information may indicate a function, such as volume up, volume down, or music play. In the device information, the location information (e.g., information about a registration place) may be information indicating a location (e.g., a registration location) of a device and may include a name of a place in which the device is located and/or a location coordinate value indicating the location of the device. For example, the location information of the device may include a name indicating a designated place in the house, such as a room or living room or may include a name of a place, such as a house or an office. For example, the location information of the device may include geo-fence information. In the device information, device state information may be, for example, information indicating a current state of a device including at least one piece of information about power on/off and an operation currently being executed.

According to an embodiment, the IoT server 602 may obtain, determine, or create a control command for controlling a device based on the stored device information. The IoT server 602 may transmit the control command to a device determined to perform an operation, based on operation information. The IoT server 602 may receive a result of the operation performance according to the control command from the device that performed the operation. The IoT server 602 may be configured, for example, as a hardware device independent from an intelligent server (e.g., the intelligent server 290 of FIG. 2), but is not limited thereto. The IoT server 602 may be a component of an intelligent server (e.g., the intelligent server 290 of FIG. 2) or a server designed to be classified by software.

According to an embodiment, the electronic device 501 may generate an ASR language model including information about a plurality of transliterations (e.g., Eun Kim and Eun Geum) for a variously utterable text (e.g., 金銀), based on a context of a user indicating a situation of the user (e.g., a situation of a contact information app operating), a basic language model, and/or a customized language model. The electronic device 501 may update the customized language model in response to an utterance of the user (e.g., "Call Eun Kim") matching one of a plurality of candidate transliterations and may provide a response (e.g., "I can call Eun Kim.") to the utterance of the user (e.g., "Call Eun Kim"), based on the updated customized language model.

According to an embodiment, the electronic device 501 may receive the utterance of the user (e.g., "Call Eun Kim"), expressing, in a second language, the text (e.g., 金銀) including a first language and may recognize the utterance (e.g., "Call Eun Kim"), based on the ASR language model including the plurality of candidate transliterations (e.g., Eun Kim and Eun Geum) that transliterates 金銀 in the second language and provide a response (e.g., "I can call Eun Kim") accordingly. The first language may be different from or the same as the second language.

Figure 6:
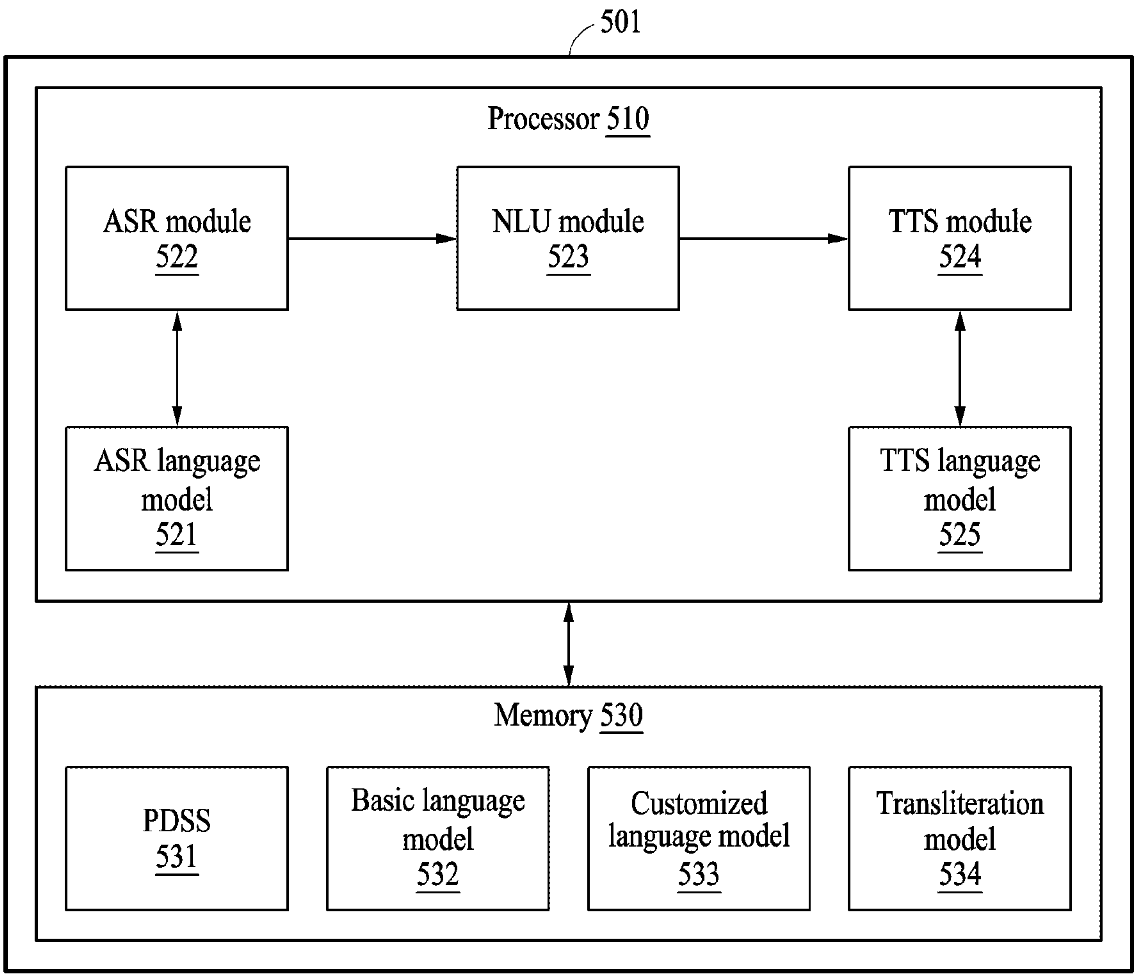
FIG. 6 is a schematic block diagram illustrating an electronic device according to an embodiment.

FIG. 6 is a schematic block diagram illustrating an electronic device according to an embodiment.

Referring to FIG. 6, according to an embodiment, an electronic device 501 may generate an ASR language model including information about a plurality of candidate transliterations (e.g., a transliteration expressed in a language designated by a user (e.g., a native language)) for variously utterable text (e.g., a text expressed in numbers and/or a language not designated by the user (e.g., a foreign language or Chinese characters), based on a context of a user indicating a situation of the user (e.g., running a game app, running a contact information app, and running a video streaming service), a basic language model, and/or a customized language model and then may update the customized language model in response to an utterance of the user matching one of the plurality of candidate transliterations. In addition, the electronic device 501 may provide a response to the utterance of the user (e.g., a response of uttering a text variously utterable in the same manner that the user utters the text) based on the updated customized language model.

According to an embodiment, the electronic device 501 may include a processor 510 (e.g., the processor 120 of FIG. 1 or the processor 203 of FIG. 2) and a memory 530 (e.g., the memory 130 of FIG. 1 or the memory 207 of FIG. 2) electrically connected to the processor 510. An ASR language model 521, an ASR module 522 (e.g., the ASR module 221 of FIG. 2), an NLU module 523 (e.g., the NLU module 223 of FIG. 2), a TTS module 524 (e.g., the TTS module 229 of FIG. 2), and a TTS language model 525 may be executed by the processor 510 and may include at least one of program code, an application, an algorithm, a routine, a set of instructions, and an AI learning model, which include instructions storable in the memory 530. In addition, at least one of the ASR language model 521, the ASR module 522, the NLU module 523, the TTS module 524, and the TTS language model 525 may be implemented as hardware or a combination of hardware and software, or in an intelligent server (e.g., the intelligent server 290 of FIG. 2). The memory 530 may store data and/or instructions (e.g., a personal data sync service (PDSS) 531), a basic language model 532, a customized language model 533, and a transliteration model 534, which are executed by the processor 510, and the data and/or instructions stored in the memory 530 may be stored in the intelligent server 290.

According to an embodiment, the ASR language model 521 may include a phoneme-to-grapheme model and/or an inverse text normalization model and may contribute to the conversion of a voice input received from the user into text data. The ASR language model 521 may include information about a plurality of candidate transliterations for variously utterable text. The ASR language model 521 may be a basis for determining a priority of the plurality of candidate transliterations for the variously utterable text, and the priority of the plurality of candidate transliterations may be based on a phoneme matching frequency.

According to an embodiment, the ASR module 522 may recognize a voice input received from the user (e.g., a voice input for a text variously utterable), based on information about a plurality of candidate transliterations included in the ASR language model 521 and convert the recognized voice input into text data.

According to an embodiment, the NLU module 523 may discern an intent of the user using the text data of the voice input. For example, the NLU module 523 may discern the intent of the user by performing syntactic analysis or semantic analysis on a user input in the form of text data.

According to an embodiment, the TTS module 524 may change information in a text form into information in a voice form, based on information about translations included in the TTS language model 525.

According to an embodiment, the TTS language model 525 may include a grapheme-to-phoneme model and/or a text normalization model and may include information about transliterations (e.g., the transliterations in the manner uttered by the user) for variously utterable text.

According to an embodiment, the PDSS 531 may, for example, be the user's stored personal data and may be stored data including contact information, installed applications, or shortcut commands.

According to an embodiment, the basic language model 532 may express characteristics of a language used by the public and may be obtained by assigning a probability value to components of a language (e.g., letters, morphemes, and words). The basic language model 532 may support a typical method of utterance for a specified component at a specified point in time, based on data on the components of the language (e.g., a public utterance method).

According to an embodiment, the customized language model 533 may express characteristics of a language used by a user and may be obtained by assigning a probability value to components of a language (e.g., letters, morphemes, and words). The customized language model 533 may support a user-customized utterance for a specified component at a specified time, based on data on language components (e.g., the user's utterance method). For example, the user language model 533 may support the user-customized utterance for a specified component at a specified time (e.g., 't' uttered as 't' sound or 't' uttered as 'd' sound), based on how the user utters the word 'water' (e.g., wɔ :tə (r), wɑ:tə (r), or wɔ :d ə (r)).

According to an embodiment, the transliteration model 534 may be learned based on training data and may create a plurality of candidate transliterations (e.g., a plurality of candidate transliterations expressed in a second language (e.g., a language specified by a user) and each of the plurality of candidate transliterations includes at least one of a different phoneme or different syllable) from a text including a first language (e.g., a language not specified by the user).

According to an embodiment, the processor 510 may obtain texts that the user is likely to utter in the user's context, select a variously utterable text from among the texts, and create a plurality of appropriate candidate transliterations for the variously utterable text. Described hereinafter in detail is an operation in which the processor 510 generates a plurality of candidate transliterations.

FIGS. 7A-7D illustrates examples of a plurality of candidate transliterations generated by an electronic device, according to an embodiment.

Figure 7A:
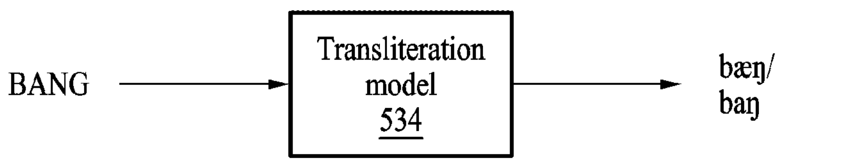
FIGS. 7A, 7B, 7C, and 7D illustrate an example of a plurality of candidate transliterations generated by an electronic device, according to an embodiment.

Referring to FIG. 7A, according to an embodiment, a transliteration model 534 may generate a plurality of candidate transliterations (e.g., bæŋ and baŋ ) for a variously utterable text (e.g., bang). The variously utterable text (e.g., bang) may be a text including a first language (e.g., a number and/or a language not specified by a user (e.g., English)). The plurality of candidate transliterations may be expressed in a second language (e.g., a language specified by the user (e.g., Korean)), and each of the plurality of candidate transliterations may include at least one of a different phoneme and a different syllable.

Figure 7B:
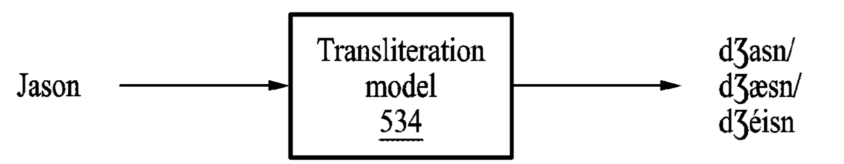

Referring to FIG. 7B, according to an embodiment, the transliteration model 534 may generate a plurality of candidate transliterations (e.g., dʒ asn, dʒæ sn, and dʒ éisn) for a variously utterable text (e.g., Jason).

Figure 7C:
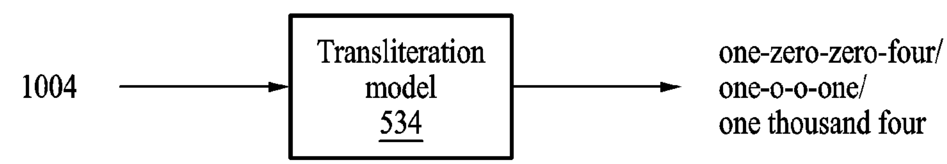

Referring to FIG. 7C, according to an embodiment, the transliteration model 534 may generate a plurality of candidate transliterations (e.g., one-zero-zero-four, one-o-o-one, and one thousand four) for a variously utterable text (e.g., 1004).

Figure 7D:
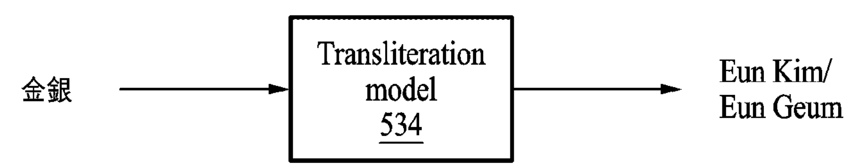

Referring to FIG. 7D, according to an embodiment, the transliteration model 534 may generate a plurality of candidate transliterations (e.g., Eun Kim and Eun Geum) for a variously utterable text (e.g., 金銀) and be learned based on training data.

Figure 8A:
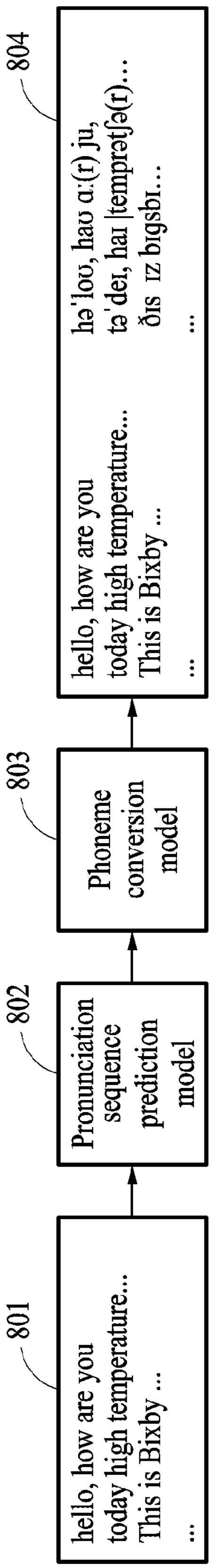
FIGS. 8A and 8B are diagrams illustrating an example operation in which an electronic device trains a transliteration model, according to an embodiment.
Figure 8B:
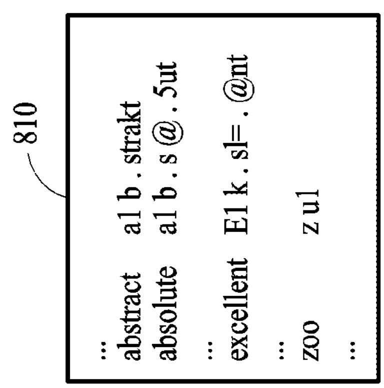

FIGS. 8A and 8B are diagrams illustrating an example operation in which an electronic device trains a transliteration model, according to an embodiment.

According to an embodiment, a processor 510 (e.g., the processor 510 of FIG. 6) may train a transliteration model (e.g., the transliteration model 534 of FIG. 6), based on training data 804. The training data 804 may include a corpus 801 (e.g., a script corpus) and a transliteration of the corpus and be obtained from a pronunciation sequence prediction model 802 and a phoneme conversion model 803.

Referring to FIG. 8A, according to an embodiment, the processor 510 may input the corpus 801 to the pronunciation sequence prediction model 802 to obtain a pronunciation of the corpus and input a pronunciation to the phoneme conversion model 803 to obtain a grapheme converted into a user-specified language (e.g., Korean), so that transliterations of the corpus may be obtained.

Referring to FIG. 8B, according to an embodiment, the processor 510 may train the pronunciation sequence prediction model 802 based on a pronunciation dictionary 810 (e.g., an English language pronunciation dictionary).

According to an embodiment, the processor 510 may train a plurality of pronunciation sequence prediction models (not shown) based on pronunciation dictionaries of various languages and obtain the training data on transliterations of various languages, based on the plurality of pronunciation sequence prediction models and a plurality of phoneme conversion models (not shown) respectively corresponding to the plurality of pronunciation sequence prediction models. The processor 510 may train a plurality of transliteration models (not shown) based on the training data of various languages and transliterate a text including a language not specified by a user (e.g., English, Greek, Latin, and Chinese) into a language specified by the user (e.g., Korean), based on each of the plurality of transliteration models.

Figure 9A:
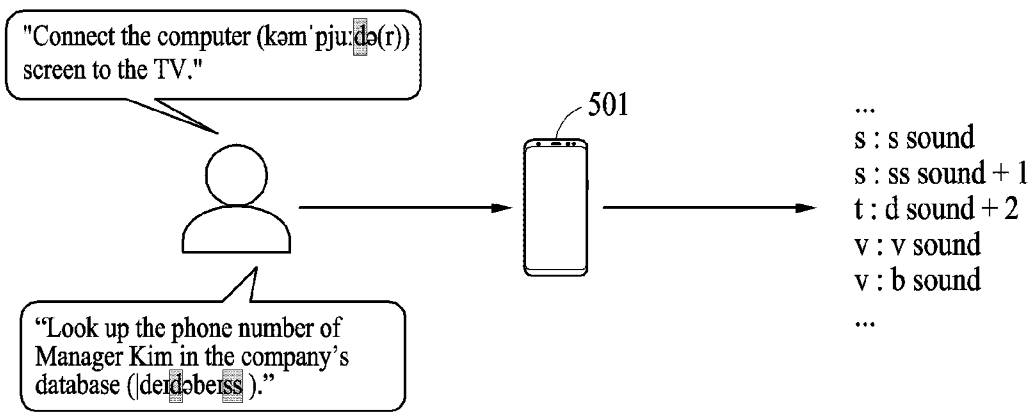
FIGS. 9A and 9B are diagrams illustrating an operation in which an electronic device determines a priority of a plurality of candidate transliterations based on a phoneme matching frequency, according to an embodiment.
Figure 9B:
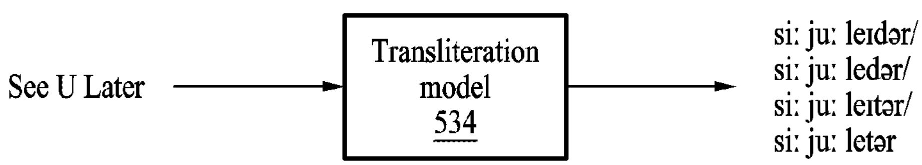

FIGS. 9A and 9B are diagrams illustrating an operation in which an electronic device determines a priority of a plurality of candidate transliterations, based on a phoneme matching frequency, according to an embodiment.

Referring to FIG. 9A, according to an embodiment, an electronic device (e.g., the electronic device 501 of FIG. 5) may store a matching frequency of a phoneme. For example, based on an utterance of a user (e.g., "Connect the computer screen to the TV"), the electronic device 501 may store a matching frequency (e.g., matching 't' with 'd') of a phoneme (e.g., 't' of 'computer'). Based on an utterance of a user (e.g., "Look up the phone number of Manager Kim in the company's database"), the electronic device 501 may store a matching frequency (e.g., matching 't' with 'd' sound and 's' with 's' sound) of phonemes (e.g., 't' in the database and 's' in the database).

Referring to FIG. 9B, according to an embodiment, a transliteration model 534 may create a plurality of candidate transliterations (e.g., si: ju: leɪdə r, si: ju: ledə r, si: ju: leɪtə r, and si: ju: letə r) for a variously utterable text (e.g., See you later.) and the electronic device 501 may prioritize the plurality of candidate transliterations based on the matching frequency of the phoneme. For example, with respect to a user who frequently utters 't' as 'd' sound, the electronic device 501 may prioritize 'si: ju: leɪdə r' and 'si: ju: ledə r' respectively over 'si: ju: leɪtə r' and 'si: ju: letə r'.

Figure 10:
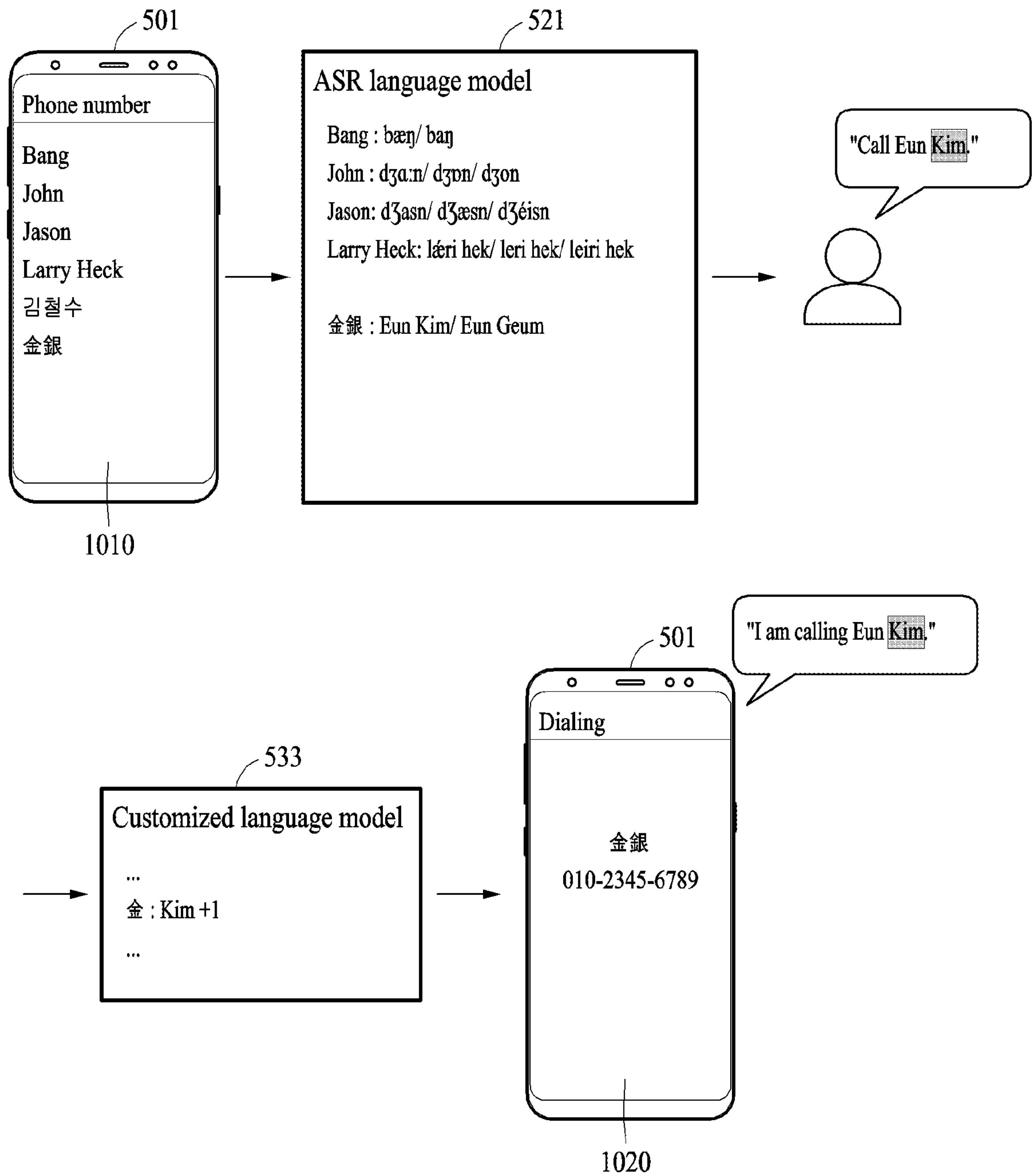
FIG. 10 illustrates an example in which an example electronic device recognizes a user's utterance and provides a response, based on a user's context, according to an embodiment.

FIG. 10 illustrates an example in which an electronic device recognizes an utterance of a user and provides a response, based on a context of a user, according to an embodiment.

Referring to FIG. 10, according to an embodiment, a processor (e.g., the processor 510 of FIG. 6) may select a variously utterable text (e.g., Bang, John, Jason, Larry, Heck, and 金 銀) in a situation of a user (e.g., running a contact information app) from among texts that the user is likely to utter (e.g., Bang, John, Jason, Larry Heck, 김철수, and 金銀). The variously utterable texts may be a text expressed in numbers and/or a language not specified by the user (e.g., English and Chinese characters). The processor 510 may generate an ASR language model 521 including information on a plurality of candidate transliterations for a selected text (e.g., bæŋ/bang for candidate transliterations of 'bang' and Eun Kim/Eun Geum for candidate transliterations of 金銀). The processor 510 may update a customized language model 533 in response to an utterance of a user (e.g., "Call Eun Kim") matching one of a plurality of candidate transliterations (e.g., Eun Kim, which is a transliteration of 金銀) among a plurality of candidate transliterations. In response to the utterance of the user (e.g., "Call Eun Kim"), the processor 510 may utter a variously utterable text (e.g., 金銀 utterable as Eun Kim or Eun Geum) in the same manner that the user utters 金銀 and may provide a response (e.g., I am calling Eun Kim") to the user.

According to an embodiment, the processor 510 may provide technology for generating a plurality of candidate transliterations for a variously utterable text and updating a customized language model in response to an utterance of a user matching one of candidate transliterations. In addition, the processor 510 may perform voice recognition and voice utterance customized for the user based on the updated customized language model, thereby improving the user's experience.

Figure 11A:
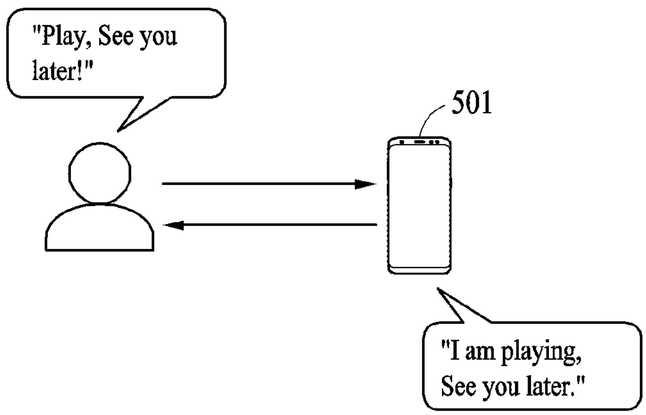
FIGS. 11A and 11B illustrate an example in which an electronic device recognizes a user's utterance based on a customized language model and provides a response, according to an embodiment.
Figure 11B:
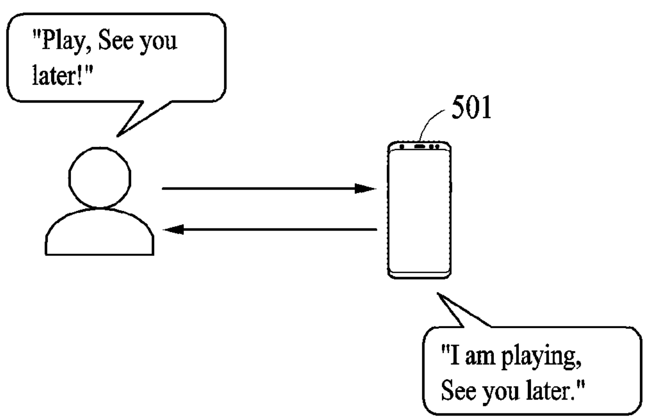

FIGS. 11A and 11B illustrate an example in which an electronic device recognizes an utterance of a user, based on a customized language model, and provides a response, according to an embodiment.

Referring to FIG. 11A, according to an embodiment, a processor (e.g., the processor 510 of FIG. 6) may, in response to an utterance of a user (e.g., "Play, See you later".), utter a variously utterable text (e.g., 'later' utterable as 'leɪtə r' or 'leɪdə r') in the same manner that the user utters 'later' (e.g., 'later' uttered as 'leɪdə r') and respond to the utterance of the user (e.g., "Play See you later".).

Referring to FIG. 11B, according to an embodiment, the processor 510 may, in response to the utterance of the user (e.g., "Play See you later."), utter a variously utterable text (e.g., 'later' utterable as 'leɪtə r' or 'leɪdə r') in the same manner that the user utters 'later' (e.g., 'later' uttered as 'leɪd ə r') and respond to the utterance of the user (e.g., "I am playing, See you later".).

According to an embodiment, the processor 510 may perform user-customized voice recognition and voice utterance based on an updated customized language model, in response to an utterance of a user matching one of candidate transliterations for a variously utterable text, thus improving the user's experience.

Figure 12:
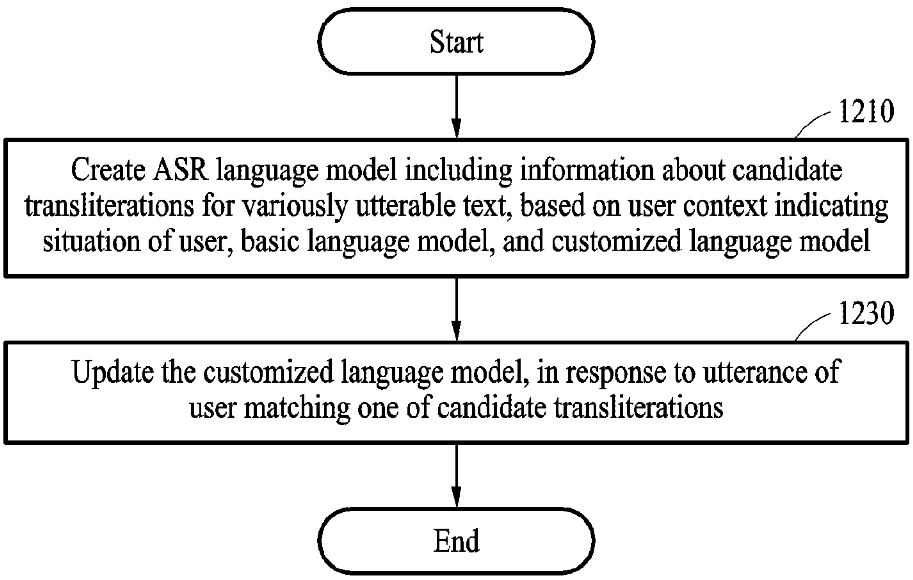
FIG. 12 is a flowchart illustrating an example of an operating method of an electronic device, according to an embodiment.

FIG. 12 is a flowchart illustrating an example of an operating method of an electronic device, according to an embodiment.

Operations 1210 and 1230 may be performed sequentially, but the disclosure is not limited in this respect. For example, the order of each operation 1210 and 1230 may change, or at least two operations may be performed in parallel.

In operation 1210, a processor (e.g., the processor 510 of FIG. 6) may create an ASR language model including information about a plurality of candidate transliterations for a variously utterable text, based on a context of a user indicating a situation of the user, a basic language model, and/or a customized language model, In operation 1230, the processor 510 may update the customized language model in response to an utterance of the user matching one of a plurality of candidate transliterations.

Figure 13:
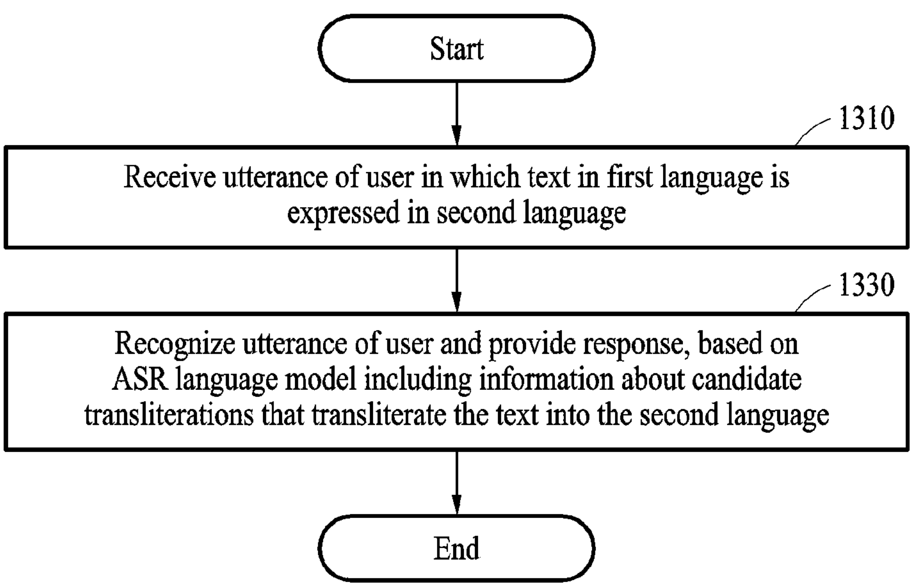
FIG. 13 is a flowchart illustrating another example of the operating method of an electronic device, according to an embodiment.

FIG. 13 is a flowchart illustrating an example of a method of operating an electronic device, according to an embodiment.

Operations 1310 and 1330 may be performed sequentially, but the disclosure is not limited in this respect. For example, the order of each operation 1310 and 1330 may change, and at least two operations may be performed in parallel.

In operation 1310, a processor (e.g., the processor 510 of FIG. 6) may receive an utterance of a user in which a text in a first language is expressed in a second language.

In operation 1330, the processor 510 may recognize the utterance of the user and provide a response, based on an ASR language model including information about a plurality of candidate transliterations that transliterate the text into the second language.

An electronic device (e.g., the electronic device 501 of FIG. 5) according to an embodiment may include a memory configured to store instructions and a processor electrically connected to the memory and configured to execute the instructions. When the instructions are executed by the processor, the processor may be configured to create an ASR language model including information about a plurality of candidate transliterations for a variously utterable text, based on a context of a user indicating a situation of the user, a basic language model, and/or a customized language model and update the customized language model in response to an utterance of the user matching one of the plurality of candidate transliterations.

According to an embodiment, the processor may be configured to provide a response corresponding to the utterance of the user, based on the updated customized language model.

According to an embodiment, the plurality of candidate transliterations may be expressed in a language specified by the user and each of the plurality of candidate transliterations may include at least one different phoneme or syllable. The text may include at least one of a number and a text expressed in a language not specified by the user.

According to an embodiment, the processor may be configured to select a variously utterable text from among texts that the user is likely to utter in the situation of the user and create the plurality of candidate transliterations for the selected text.

According to an embodiment, the processor may be configured to obtain the plurality of candidate transliterations by inputting the selected text to a transliteration model learned based on training data.

According to an embodiment, the training data may include a corpus and a transliteration of the corpus. The processor may be configured to obtain the transliteration of the corpus by inputting the corpus to a pronunciation sequence prediction model to obtain a pronunciation of the corpus and input the pronunciation to a phoneme conversion model to obtain a grapheme converted into a language specified by the user.

According to an embodiment, the processor may be configured to convert the utterance of the user into text data, perform an operation of matching the text data with the plurality of candidate transliterations, and update the customized language model by determining a matched candidate transliteration as a correct answer for the variously utterable text when the text data matches one of the plurality of candidate transliterations.

According to an embodiment, the processor may be configured to provide a response of uttering the variously utterable text in the same manner that the correct answer utters the text.

According to an embodiment, the processor may be configured to determine a priority of the plurality of candidate transliterations, based on a matching frequency of a phoneme.

An electronic device 501 according to an embodiment may include a memory configured to store instructions and a processor electrically connected to the memory and configured to execute the instructions. When the instructions are executed by the processor, the processor may be configured to receive an utterance of a user in which a text including a first language is expressed in a second language and recognize the utterance and provide a response, based on an ASR language model including information about a plurality of candidate transliterations transliterated into the second language for the text.

According to an embodiment, the ASR language model may be created based on the context of the user indicating a situation of the user, a basic language model, and/or a customized language model. The customized language model may be updated in response to the utterance of the user matching one of the plurality of candidate transliterations.

According to an embodiment, the first language may include at least one of a number and a language not specified by the user, the second language may be a language specified by the user, and the plurality of candidate transliterations may be expressed in the second language and each of the plurality of candidate transliterations may include at least one different phoneme or syllable.

According to an embodiment, the processor may be configured to select a text including the first language from among texts that the user is likely to utter in the situation of the user and create a plurality of candidate transliterations for the selected text.

According to an embodiment, the processor may be configured to obtain the plurality of candidate transliterations by inputting the selected text to a transliteration model learned based on training data.

According to an embodiment, the training data may include a corpus and a transliteration of the corpus. The processor may be configured to obtain the transliteration of the corpus by inputting the corpus to a pronunciation sequence prediction model to obtain a pronunciation of the corpus and inputting the pronunciation to a phoneme conversion model to obtain a grapheme converted into a language specified by the user.

According to an embodiment, the processor may be configured to convert the utterance of the user into text data, perform an operation of matching the text data with the plurality of candidate transliterations, and update the customized language model by determining a matched candidate transliteration as a correct answer for the text including the first language when the text data matches one of the plurality of candidate transliterations.

According to an embodiment, the processor may be configured to provide a response of uttering the text including the first language in the same manner that the correct answer utters the text.

According to an embodiment, the processor may be configured to determine a priority of the plurality of candidate transliterations, based on a matching frequency of a phoneme.

A method of operating an electronic device 501, according to an embodiment, may include creating an ASR language model including information about a plurality of candidate transliterations for a variously utterable text, based on a context of a user indicating a situation of the user, a basic language model, and a customized language model and updating the customized language model in response to an utterance of the user matching one of the plurality of candidate transliterations.

According to an embodiment, the method of operating the electronic device 501 may further include providing a response corresponding to the utterance of the user, based on the updated customized language model.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

memory configured to store instructions; and at least one processor, comprising processing circuitry, electrically connected to the memory and configured, individually or collectively, to execute the instructions and to control the electronic device to:

train a transliteration model based on training data comprising a corpus and a transliteration of the corpus by inputting the corpus to a pronunciation sequence prediction model to obtain a pronunciation of the corpus and inputting the pronunciation of the corpus to a phoneme conversion model to obtain a grapheme converted into a user-specified language;

create an automatic speech recognition (ASR) language model comprising information about a plurality of candidate transliterations obtained from the transliteration model for a same text utterable in various different ways, based on a context of a user indicating a situation of the user;

receive, via a microphone, an utterance of the user;

update a language model customized to language characteristics of the user in response to the utterance of the user matching one of the plurality of candidate transliterations; and provide, via a speaker, a response corresponding to the utterance of the user in which the variously utterable text is uttered in a manner customized for the user, based on the updated customized language model.

2. The electronic device of claim 1, wherein the plurality of candidate transliterations is expressed in a user-specified language and each of the plurality of candidate transliterations comprises at least one different phoneme or syllable, and the variously utterable text comprises at least one of a number or a text expressed in a language not specified by the user.

3. The electronic device of claim 1, wherein at least one processor comprising processing circuitry is configured, individually or collectively, to control the electronic device to:

select a variously utterable text from among texts that the user is likely to utter in the situation of the user; and create a plurality of candidate transliterations for the selected text.

4. The electronic device of claim 3, wherein at least one processor comprising processing circuitry is configured, individually or collectively, to control the electronic device to obtain the plurality of candidate transliterations by inputting the selected text to the transliteration model.

5. The electronic device of claim 1, wherein at least one processor comprising processing circuitry is configured, individually or collectively, to control the electronic device to:

convert the utterance of the user into text data;

perform an operation of matching the text data with the plurality of candidate transliterations; and update the customized language model by determining a matched candidate transliteration as a correct answer for the variously utterable text when the text data matches one of the plurality of candidate transliterations.

6. The electronic device of claim 5, wherein at least one processor comprising processing circuitry is configured individually or collectively to control the electronic device to provide a response of uttering the variously utterable text in a same manner that the correct answer utters the text.

7. The electronic device of claim 1, wherein at least one processor comprising processing circuitry is configured, individually or collectively, to control the electronic device to determine a priority of the plurality of candidate transliterations, based on a matching frequency of a phoneme.

8. The electronic device of claim 1, wherein at least one processor comprising processing circuitry is configured, individually or collectively, to control the electronic device to:

update the language model customized to language characteristics of the user by determining a candidate transliteration matching the utterance of the user among the plurality of candidate transliterations as a correct answer for a variously utterable text; and provide, via the speaker, a response corresponding to the utterance of the user in which a sound of the variously utterable text corresponds to the correct answer, based on the updated customized language model.

9. An electronic device comprising:

memory configured to store instructions; and at least one processor, comprising processing circuitry, electrically connected to the memory and configured, individually or collectively, to execute the instructions and to control the electronic device to:

train a transliteration model based on training data comprising a corpus and a transliteration of the corpus by inputting the corpus to a pronunciation sequence prediction model to obtain a pronunciation of the corpus and inputting the pronunciation of the corpus to a phoneme conversion model to obtain a grapheme converted into a user-specified language;

receive, via a microphone, an utterance of a user in which a text comprising a first language is expressed in a second language;

recognize the utterance and provide a response, based on an automatic speech recognition (ASR) language model created based on a context of the user indicating a situation of the user and comprising information about a plurality of candidate transliterations transliterated into the second language for the text using the transliteration model;

convert the utterance of the user into text data;

match the text data with the plurality of candidate transliterations;

update a customized language model by determining a matched candidate transliteration as a correct answer for the text comprising the first language when the text data matches one of the plurality of candidate transliterations; and provide a response of uttering the text comprising the first language in a same manner that the correct answer utters the text.

10. The electronic device of claim 9, wherein the first language comprises at least one of a number or a language not specified by the user, the second language is a language specified by the user, and the plurality of candidate transliterations is expressed in the second language and each of the plurality of candidate transliterations comprises at least one different phoneme or syllable.

11. The electronic device of claim 9, wherein at least one processor comprising processing circuitry is configured, individually or collectively, to control the electronic device to:

select a text comprising the first language from among texts that the user is likely to utter in a situation of the user; and create a plurality of candidate transliterations for the selected text.

12. The electronic device of claim 11, wherein at least one processor comprising processing circuitry is configured, individually or collectively, to control the electronic device to obtain the plurality of candidate transliterations by inputting the selected text to the transliteration model.

13. The electronic device of claim 9, wherein at least one processor comprising processing circuitry is configured, individually or collectively, to control the electronic device to determine a priority of the plurality of candidate transliterations, based on a matching frequency of a phoneme.

14. A method of operating an electronic device, the method comprising:

training a transliteration model based on training data comprising a corpus and a transliteration of the corpus by inputting the corpus to a pronunciation sequence prediction model to obtain a pronunciation of the corpus and inputting the pronunciation of the corpus to a phoneme conversion model to obtain a grapheme converted into a user-specified language;

creating an automatic speech recognition (ASR) language model comprising information about a plurality of candidate transliterations obtained from the transliteration model for a same text utterable in various different ways, based on a context of a user indicating a situation of the user;

receive, via a microphone, an utterance of the user;

updating a customized language model customized to language characteristics of the user in response to an utterance of the user matching one of the plurality of candidate transliterations; and providing, via a speaker, a response corresponding to the utterance of the user in which the variously utterable text is uttered in a manner customized for the user, based on the updated customized language model.

* * * * *